(12) United States Patent
Stanjek et al.

(10) Patent No.: US 11,059,970 B2
(45) Date of Patent: Jul. 13, 2021

(54) CROSS-LINKABLE COATING COMPOSITIONS BASED ON ORGANYL OXYSILANE-TERMINATED POLYMERS

(71) Applicant: Wacker Chemie AG, Munich (DE)

(72) Inventors: Volker Stanjek, Ampfing (DE); Udo Anders, Sankt Wolfgang (DE); Kurt Reitmajer, Kirchdorf (DE); Lars Zander, Altoetting (DE)

(73) Assignee: Wacker Chemie AG, Munich (DE)

( * ) Notice: Subject to any disclaimer, the term of this patent is extended or adjusted under 35 U.S.C. 154(b) by 25 days.

(21) Appl. No.: 16/321,058

(22) PCT Filed: Aug. 3, 2016

(86) PCT No.: PCT/EP2016/068587
§ 371 (c)(1),
(2) Date: Jan. 28, 2019

(87) PCT Pub. No.: WO2018/024331
PCT Pub. Date: Feb. 8, 2018

(65) Prior Publication Data
US 2019/0177541 A1    Jun. 13, 2019

(51) Int. Cl.
*C08L 83/04* (2006.01)
*C09D 183/04* (2006.01)
*C08G 77/00* (2006.01)

(52) U.S. Cl.
CPC ............ *C08L 83/04* (2013.01); *C09D 183/04* (2013.01); *C08G 77/80* (2013.01); *C08L 2312/08* (2013.01)

(58) Field of Classification Search
CPC ... C08L 83/04; C08L 2312/08; C09D 183/04; C08G 77/80
USPC .......................................................... 524/500
See application file for complete search history.

(56) References Cited

U.S. PATENT DOCUMENTS

| | | |
|---|---|---|
| 2014/0155545 A1 | 6/2014 | Stanjek et al. |
| 2014/0311674 A1 | 10/2014 | Stanjek et al. |
| 2016/0160103 A1 | 6/2016 | Stanjek et al. |
| 2017/0369740 A1 | 12/2017 | Stanjek et al. |

FOREIGN PATENT DOCUMENTS

| | | |
|---|---|---|
| DE | 102011081264 A1 | 2/2013 |
| DE | 102011087603 A1 | 6/2013 |
| WO | 13026654 A1 | 2/2013 |
| WO | 15024773 A1 | 2/2015 |
| WO | 16116415 A1 | 7/2016 |

*Primary Examiner* — Josephine L Chang
(74) *Attorney, Agent, or Firm* — Brooks Kushman P.C.

(57) ABSTRACT

Crosslinkable compositions especially useful for coatings containing an alkoxysilyoxy-terminated polymer and a silicone resin.

12 Claims, No Drawings

CROSS-LINKABLE COATING COMPOSITIONS BASED ON ORGANYL OXYSILANE-TERMINATED POLYMERS

CROSS REFERENCE TO RELATED APPLICATIONS

This application is the U.S. National Phase of PCT Appln. No. PCT/EP2016/068587 filed Aug. 3, 2016, the disclosure of which is incorporated in its entirety by reference herein.

BACKGROUND OF THE INVENTION

1. Field of the Invention

The invention relates to coating compositions based on crosslinkable compositions containing certain silane-crosslinking prepolymers and silicone resins, to processes for the production thereof and to the use thereof for coating floors.

2. Description of the Related Art

Floors typically consist of a sequentially constructing unit comprising a subfloor and a wear layer. The subfloor is often composed of a carrier layer made of concrete and interlayers optionally arranged thereupon. The latter is generally screed or mastic asphalt, and is used to level the subfloor or else to reduce a gradient. Other subfloors are likewise conceivable, however. Common examples include inter alia wooden floors, for example floorboards, laminate floors or parquet floors.

The actual surface layer is applied to these subfloors. It serves to protect the subfloor from mechanical wear but also from soiling or chemical attack. It must also meet the optical requirements of the floor coating.

Important properties such as surface strength (determinable by scratch tests), resistance to chemicals but also to moisture and frost must be ensured. Of particular importance is also the need for a low soiling propensity, i.e. any particular soiling should be residuelessly removable. Optical properties, for example color depth-enhancing effects for wood or stone floors—in the case of wood floors this is referred to as so-called grain enhancement—are also important criteria.

Surface coatings based on cementitious systems are widespread. However, these often have the disadvantage of only modest mechanical resilience, undergo swelling upon exposure to moisture and have insufficient frost resistance. The optics thereof are also inadequate for many applications.

Coatings based on organic polymer systems, in particular epoxy resins or polyurethane coatings, often exhibit markedly better properties. Here, there are broad product palettes for a very wide variety of applications from coatings for purely industrial floors through basement and storeroom floors right up to high optical quality coatings for hospitals, schools, nurseries, large office buildings, entrance halls or else retail and exhibition spaces. Organic lacquer systems are also employed for wood floors. While factory wood coatings often employ UV-curing acrylate lacquers, coating and re-coating of previously installed wood floors likewise employ especially, polyurethane systems.

However, the disadvantage of these systems is the toxicologically questionable properties of the still uncrosslinked liquid components. Polyurethane coatings contain isocyanates, especially also residual contents of isocyanate monomers which are classed as toxicologically critical. By contrast, epoxy resin systems contain the amine curing agents which are likewise classed as toxicologically critical. Both systems exhibit sensitizing properties.

In addition, most epoxy resin or polyurethane coatings are user-unfriendly two-component systems.

For toxicological reasons in particular, silane-crosslinking coatings curable by condensation reactions of alkoxysilyl groups would be highly desirable. This reaction occurs upon contact with atmospheric humidity and such systems are therefore generally employable as one-component systems. In addition, the silyl groups may also react with a multiplicity of reactive OH groups of the subfloor and the relevant products therefore often have outstanding adhesion properties.

Particularly advantageous in respect of rapid curing of silane-crosslinking coatings is the use of so-called α-silane-terminated prepolymers having reactive alkoxysilyl groups that are bonded to an adjacent urethane unit via a methylene spacer. This compound class is highly reactive and requires neither tin catalysts nor strong acids or bases in order to achieve high curing rates upon exposure to air. Commercially available α-silane-terminated prepolymers include GENIOSIL® STP-E10 or GENIOSIL® STP-E30 from Wacker Chemie AG, Munich, Germany.

However, in the past it has not been possible, either on the basis of α-silane-crosslinking prepolymers or with conventional silane-crosslinking prepolymers, to provide systems which meet the very high mechanical requirements demanded of a floor coating.

A very promising approach is described in WO 2013/026654 in which long-chain silane-terminated polyethers having molar masses of 12,000 g/mol are mixed with phenylsilicone resins. The thus-obtained compositions are in particular touted as ideal binders for adhesives having a high hardness and tensile shear strength but it is also mentioned that such materials may also be employed as sealants, potting compounds or coatings. It is therefore conceivable that such markedly harder binder systems could also be suitable for floor coatings.

However, it has been found that silane-crosslinking binder systems, such as are described in WO 2013/026654, do not exhibit sufficiently advantageous soiling propensities for them to be able to be used for floor coatings. In particular, common substances such as coffee, mustard, ketchup, balsamic vinegar, and also gasoline or lactic acid, result in unremovable stains.

The present invention accordingly has for its object to provide floor coatings based on toxicologically especially advantageous silane-crosslinking binders with which the disadvantages of the prior art products may be overcome.

SUMMARY OF THE INVENTION

The present invention thus provides crosslinkable coating compositions
(M) containing
(A) 100 parts by weight of compounds of formula

$$Y-[(CR^1{}_2)_b-SiR_a(OR^2)_{3-a}]_x \qquad (I),$$

wherein
Y represents an x-valent polymer radical bonded via nitrogen, oxygen, sulfur or carbon which has a number-average molecular mass of 200 to 10 000 g/mol and which contains no aromatic structural elements having nitrogen or oxygen atoms bonded directly to the aromatic,
R may be identical or different and represents a monovalent, optionally substituted SiC-bonded hydrocarbon radical, R¹ may be identical or different and represents hydrogen or a monovalent, optionally substituted hydrocarbon radical that may be attached to the carbon atom via nitrogen, phosphorus, oxygen, sulfur or a carbonyl group, R² may be identical or different and represents hydrogen or a monovalent, optionally substituted hydrocarbon radical, x is an integer from 1 to 10, preferably 1, 2 or 3, more preferably 1 or 2, a may be identical or different and is 0, 1 or 2, preferably 0 or 1, and b may be identical or different and is an integer from 1 to 10, preferably 1, 3 or 4, more preferably 1 or 3, and in particular 1, and (B) at least 100 parts by weight of silicone resins containing units of formula $$R^3_c(R^4O)_dR^5_eSiO_{(4-c-d-e)/2} \qquad (II),$$

wherein

R³ may be identical or different and represents hydrogen, a monovalent, SiC-bonded, optionally substituted aliphatic hydrocarbon radical or a divalent, optionally substituted aliphatic hydrocarbon radical that bridges two units of formula (II), R⁴ may be identical or different and represents hydrogen or a monovalent, optionally substituted hydrocarbon radical, R⁵ may be identical or different and represents a monovalent, SiC-bonded, optionally substituted aromatic hydrocarbon radical, c is 0, 1, 2 or 3, d is 0, 1, 2 or 3, preferably 0, 1 or 2, particularly preferably 0 or 1, and e is 0, 1 or 2, preferably 0 or 1, with the proviso that the sum of c+d+e is less than or equal to 3 and in at least 40% of the units of formula (II) the sum of c+e is 0 or 1.

It is preferable when the compositions (M) according to the invention contain less than 100 parts by weight, particularly preferably less than 50 parts by weight, and in particular less than 10 parts by weight, of compounds (C1) of formula $$Y^1\text{—}[(CR^1_2)_b\text{—}SiR_a(OR^2)_{3-a}]_x \qquad (I'),$$

wherein Y¹ is an x-valent polymer radical bonded via nitrogen, oxygen, sulfur or carbon which has a number-average molecular mass $M_n$ of more than 10,000 g/mol and R, R¹, R², a, b and x in each case may be identical or different and have one of the abovementioned definitions.

In a particularly preferred embodiment of the invention, the compositions (M) according to the invention contain no compounds (C1).

It is preferable when the compositions (M) according to the invention contain less than 100 parts by weight, more preferably less than 50 parts by weight, and in particular less than 10 parts by weight, of compounds (C2) of formula $$Y^2\text{—}[(CR^1_2)_b\text{—}SiR_a(OR^2)_{3-a}]_x \qquad (I''),$$

wherein Y² is an x-valent polymer radical bonded via nitrogen, oxygen, sulfur or carbon which contains aromatic structural elements comprising nitrogen or oxygen atoms bonded directly to the aromatic and R, R¹, R², a, b and x in each case may be identical or different and have one of the abovementioned definitions.

In a particularly preferred embodiment of the invention, the compositions (M) according to the invention contain no compounds (C2).

The optionally employed compounds (C2) are exceptionally UV labile and thus negatively impair the UV stability of the resulting coating.

The invention is based on the surprising discovery that coatings based on the inventive compositions (M) based on short-chain silane-terminated polymers (A) which contain only small proportions, if any, of correspondingly long-chain and/or aromatic silane-terminated polymers (C1)/(C2) and high mass fractions of silicone resins (B) according to the invention exhibit a markedly better soiling propensity than compositions such as are described in the prior art, in particular in WO 2013/026654.

Examples of radicals R are alkyl radicals such as methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as n-octyl, isooctyl and 2,2,4-trimethylpentyl radicals; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl; alkaryl radicals such as the o-, m-, p-tolyl; xylyl radicals and ethylphenyl radicals; and aralkyl radicals such as benzyl, α-phenylethyl and β-phenylethyl radicals.

Examples of substituted radicals R are haloalkyl radicals such as the 3,3,3-trifluoro-n-propyl, 2,2,2,2',2',2'-hexafluoroisopropyl and heptafluoroisopropyl radicals, and haloaryl radicals such as the o-, m- and p-chlorophenyl radicals.

Preferably, radical R represents optionally halogen-substituted, monovalent hydrocarbon radicals having 1 to 6 carbon atoms, more preferably alkyl radicals having 1 or 2 carbon atoms, and in particular the methyl radical.

Examples of radicals R¹ are hydrogen, the radicals recited for R and optionally substituted hydrocarbon radicals bonded to the carbon atom via nitrogen, phosphorus, oxygen, sulfur, carbon, or a carbonyl group.

It is preferable when radical R¹ represents hydrogen or hydrocarbon radicals having 1 to 20 carbon atoms, in particular hydrogen.

Examples of radical R² are hydrogen or the examples recited for radical R. It is preferable when radical R² represents hydrogen or optionally halogen-substituted alkyl radicals having 1 to 10 carbon atoms, more preferably alkyl radicals having 1 to 4 carbon atoms, and in particular methyl or ethyl.

The radicals Y preferably have number-average molar masses $M_n$ of at least 500 g/mol, in particular of at least 1000 g/mol. The radicals Y preferably have number-average molar masses $M_n$ of at most 8000 g/mol, in particular at most 6000 g/mol.

In the context of the present invention, the number-average molar mass $M_n$ is determined by size exclusion chromatography (SEC) against a polystyrene standard, in THF, at 60° C., at a flow rate of 1.2 ml/min and with RI detection (refractive index detector) in a Styragel HR3-HR4-HR5-HR5 column set from Waters Corp. USA with an injection volume of 100 μL.

Examples of polymer radical Y are organic polymer radicals which have a number-average molecular mass of 200 to 10,000 g/mol and which contain as the polymer chain polyoxyalkylenes such as polyoxyethylene, polyoxypropylene, polyoxybutylene, polyoxytetramethylene, polyoxyethylene-polyoxypropylene copolymers and polyoxypropylene-polyoxybutylene copolymers; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymers or polycarbonates and which are bonded to the group/groups —[(CR$^1_2$)$_b$—SiR$_a$(OR$^2$)$_{3-a}$] preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O— or —NR'—, wherein R' may be identical or different and has a definition as recited for R or represents a group —CH(COOR")—CH$_2$—COOR" in which R" may be identical or different and has a definition as recited for R.

Radical R' is preferably a group —CH(COOR")—CH$_2$—COOR" or an optionally substituted hydrocarbon radical having 1 to 20 carbon atoms, particularly preferably a linear, branched or cyclic alkyl group having 1 to 20 carbon atoms or an optionally halogen-substituted aryl group having 6 to 20 carbon atoms.

Examples of radicals R' are cyclohexyl, cyclopentyl, n- and isopropyl, n-, iso- and t-butyl, the various stereoisomers of pentyl, hexyl or heptyl, and phenyl.

The radicals R" are preferably alkyl groups having 1 to 10 carbon atoms, more preferably methyl, ethyl or propyl radicals.

It is preferable when the polymer radical Y represents polyester, polyether, polyurethane, polyalkylene or polyacrylate radicals, more preferably polyurethane radicals, polyester radicals or polyoxyalkylene radicals, in particular polyoxypropylene radicals, with the proviso that the number-average molecular mass thereof is 200 to 10,000 g/mol.

The component (A) may comprise the groups —[(CR$^1_2$)$_b$—SiR$_a$(OR$^2$)$_{3-a}$] attached as described at any desired positions in the polymer, such as for instance internally and/or terminally.

It is more preferable when radical Y in formula (I) represents polyester radicals, polyurethane radicals or polyoxyalkylene radicals having a number-average molecular mass of 200 to 10,000 g/mol to which the groups —[(CR$^1_2$)$_b$—SiR$_a$(OR$^2$)$_{3-a}$] are terminally attached. The radicals Y are preferably linear or have 1 to 3 branching points, and more preferably are linear.

The polyurethane radicals Y are preferably radicals whose chain ends are bonded to the group/groups —[(CR$^1_2$)$_b$—SiR$_a$(OR$^2$)$_{3-a}$] via —NH—C(=O)O—, —NH—C(=O)—NH—, —NR$^3$—C(=O)—NH— or —NH—C(=O)—NR'—, in particular via —O—C(=O)—NH— or —NH—C(=O)—NR'—, wherein all radicals and indices have one of the abovementioned definitions. The polyurethane radicals Y are preferably produced from linear or branched polyoxyalkylenes, in particular from polypropylene glycols, and di- or polyisocyanates. Suitable processes for producing a corresponding component (A) and also examples of the component (A) itself are described inter alia in EP 1 093 482 B1 (paragraphs [0014]-[0023], [0039]-[0055] and example 1 and comparative example 1) or EP 1 641 854 B1 (paragraphs [0014]-[0035], examples 4 and 6 and comparative examples 1 and 2) which form part of the disclosure of the present application.

The polyester radicals Y are preferably polymeric reaction products of monomeric dicarboxylic acids and monomeric diols or else of hydroxycarboxylic acids or else of cyclic lactones such as for example ε-caprolactone.

The polyoxyalkylene radicals Y are preferably linear or branched polyoxyalkylene radicals, more preferably polyoxypropylene radicals, whose chain ends are preferably bonded to the group/groups —[(CR$^1_2$)$_b$—SiR$_a$(OR$^2$)$_{3-a}$] via —O—C(=O)—NH— or —O—, wherein the radicals and indices have one of the abovementioned definitions. It is preferable when at least 85%, more preferably at least 90%, and in particular at least 95%, of all chain ends are bonded to the group —[(CR$^1_2$)$_b$—SiR$_a$(OR$^2$)$_{3-a}$] via —O—C(=O)—NH—.

Suitable processes for producing a component (A) in which Y represents a polyoxyalkylene radical, and also examples of a corresponding component (A) are described inter alia in EP 1 535 940 B1 (paragraphs [0005]-[0025] and also examples 1-3 and comparative examples 1-4) or EP 1 896 523 B1 (paragraphs [0008]-[0047]) which form part of the disclosure of the present application.

The end groups of the compounds (A) for use according to the invention are preferably those of general formulae

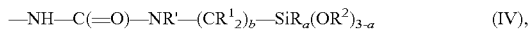  (IV),

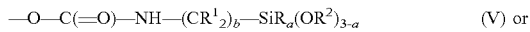  (V) or

  (VI), wherein the radicals and indices have one of the definitions recited therefor hereinabove.

Provided that the compounds (A) are polyurethanes, as is preferred, these preferably comprise one or more of the end groups

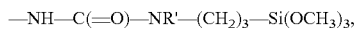

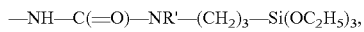

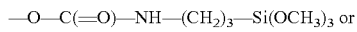

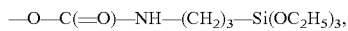

wherein R' has one of the abovementioned definitions.

Provided that the compounds (A) are polypropylene glycols, as is particularly preferred, these preferably comprise one or more of the end groups

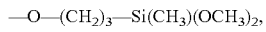

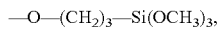

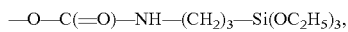

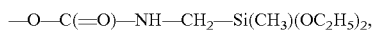

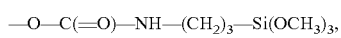

wherein the two last-mentioned end groups are particularly preferred.

The average molecular weights $M_n$ of the compounds (A) are preferably at least 500 g/mol, more preferably at least 1000 g/mol, yet more preferably at most 10,000 g/mol, even more preferably at most 8000 g/mol, and in particular at most 6500 g/mol.

The viscosity of the compounds (A) is by preference at least 0.2 Pas, more preferably at least 1 Pas, and by preference at most 8 Pas, more preferably at most 4 Pas, in each case measured at 23° C.

The viscosity is determined in the context of the present invention, after temperature regulation to 23° C., using a DV 3 P rotary viscometer from A. Paar (Brookfield system) using spindle 5 at 2.5 rpm in accordance with ISO 2555.

The compounds (A) employed according to the invention may be produced by processes commonly used in chemistry.

Production of the polymers (A) may be effected by known methods, such as addition reactions, for example hydrosilylation, Michael addition, Diels-Alder addition or reactions between isocyanate-functional compounds and compounds having isocyanate-reactive groups.

The component (A) employed according to the invention may contain just one type of compound of formula (I) or else mixtures of different species of compounds of formula (I). Thus the component (A) may contain exclusively compounds of formula (I) where more than 90%, preferably more than 95% and more preferably more than 98% of all silyl groups bonded to the radical Y are identical. However, it is also possible to use a component (A) which at least partially contains compounds of formula (I) where different silyl groups are bonded to a Y radical. It is finally also possible to employ as component (A) mixtures of various compounds of formula (I) in which altogether at least 2 different types of silyl groups bonded to radicals Y are present while, however, all silyl groups bonded to any one radical Y are identical.

The compositions (M) according to the invention preferably contain compounds (A) in concentrations of at most 40% by weight, more preferably at most 30% by weight and preferably at least 3% by weight, more preferably at least 5% by weight.

Based on 100 parts by weight of the component (A), the compositions (M) according to the invention preferably contain at least 150 parts by weight, more preferably at least 200 parts by weight, and in particular at least 300 parts by weight, of component (B). Based on 100 parts by weight of the component (A), the compositions (M) according to the invention preferably contain at most 5000 parts by weight, more preferably at most 2500 parts by weight, and in particular at most 1500 parts by weight, of component (B).

Component (B) preferably consists to an extent of at least 90% by weight of units of formula (II). Component (B) more preferably consists exclusively of units of formula (II).

Examples of radicals $R^3$ are the aliphatic radicals recited for R hereinabove. However, radical $R^3$ may also represent divalent aliphatic radicals that connect two silyl groups of formula (II) to one another, for example alkylene radicals having 1 to 10 carbon atoms, such as methylene, ethylene, propylene or butylene radicals. A particularly commonly used example of a divalent aliphatic radical is the ethylene radical.

However, radical $R^3$ preferably represents optionally halogen-substituted, monovalent SiC-bonded aliphatic hydrocarbon radicals having 1 to 18 carbon atoms, more preferably aliphatic hydrocarbon radicals having 1 to 8 carbon atoms, such as methyl, ethyl, propyl, butyl, n-octyl, or i-octyl radicals, in particular i-octyl or methyl, wherein methyl is most preferred.

Examples of radical $R^4$ are hydrogen or the examples recited for radical R. Radical $R^4$ preferably represents hydrogen or optionally halogen-substituted alkyl radicals having 1 to 10 carbon atoms, more preferably alkyl radicals having 1 to 4 carbon atoms, and in particular methyl or ethyl.

Examples of radicals $R^5$ are the aromatic radicals recited for R above. Radical $R^5$ preferably represents optionally halogen-substituted, SiC-bonded aromatic hydrocarbons having 1 to 18 carbon atoms, for example, phenyl, tolyl, xylyl, chlorophenyl, naphthyl, or styryl radicals, more preferably phenyl.

It is preferable to employ as component (B) silicone resins in which at least 90% of all radicals $R^3$ represent n-octyl, i-octyl or methyl, particular preference being given to at least 90% of all radicals $R^3$ representing methyl.

It is preferable to employ as component (B) silicone resins in which at least 90% of all radicals $R^4$ represent methyl, ethyl, propyl or isopropyl.

It is preferable to employ as component (B) silicone resins in which at least 90% of all radicals $R^5$ represent phenyl.

It is preferable according to the invention to employ silicone resins (B) comprising at least 20%, more preferably at least 40%, units of formula (II) in which c is 0, in each case based on the totality of units of formula (II).

It is preferable to employ silicone resins (B) comprising, in each case based on the totality of units of formula (II), at least 70%, more preferably at least 80%, of units of formula (II) in which d takes the value 0 or 1.

It is preferable to employ as component (B) silicone resins which, in each case based on the totality of units of formula (II), comprise at least 20%, more preferably at least 40%, and in particular at least 50%, units of formula (II) in which e takes the value 1.

One particular embodiment of the invention comprises employing silicone resins (B) comprising exclusively units of formula (II) in which e is 1.

A particularly preferred embodiment of the invention comprises employing as component (B) silicone resins which, in each case based on the totality of units of formula (II), comprise at least 20%, more preferably at least 40%, and in particular at least 50%, of units of formula (II) in which e takes the value 1 and c takes the value 0.

It is preferable to employ as component (B) silicone resins which, in each case based on the totality of units of formula (II), comprise at least 50%, preferably at least 60%, particularly preferably at least 70%, of units of formula (II) in which the sum c+e is 0 or 1.

Examples of the silicone resins (B) employed according to the invention are organopolysiloxane resins consisting substantially, preferably exclusively, of units selected from (Q) units of formulae $SiO_{4/2}$, $Si(OR^4)O_{3/2}$, $Si(OR^4)_2O_{2/2}$ and $Si(OR^4)_3O_{1/2}$, (T) units of formulae $PhSiO_{3/2}$, $PhSi(OR^4)O_{2/2}$, $PhSi(OR^4)_2O_{1/2}$, $MeSiO_{3/2}$, $MeSi(OR^4)O_{2/2}$, $MeSi(OR^4)_2O_{1/2}$, i-$OctSiO_{3/2}$, i-$OctSi(OR^4)O_{2/2}$, i-$OctSi(OR^4)_2O_{1/2}$, n-$OctSiO_{3/2}$, n-$OctSi(OR^4)O_{2/2}$ and n-$OctSi(OR^4)_2O_{1/2}$, (D) units of formulae $Me_2SiO_{2/2}$ and $Me_2Si(OR^4)O_{1/2}$ and also (M) units of formula $Me_3SiO_{1/2}$, wherein Me represents methyl, Ph represents phenyl, n-Oct represents n-octyl and i-Oct represents isooctyl and $R^4$ represents hydrogen or optionally halogen-substituted alkyl radicals having 1 to 10 carbon atoms, more preferably unsubstituted alkyl radicals having 1 to 4 carbon atoms, wherein the resin preferably comprises per mole of (T) units 0-2 mol of (Q) units, 0-2 mol of (D) units and 0-2 mol of (M) units.

Preferred examples of the silicone resins (B) employed according to the invention are organopolysiloxane resins consisting substantially, preferably exclusively, of units selected from T units of formulae $PhSiO_{3/2}$, $PhSi(OR^4)O_{2/2}$ and $PhSi(OR^4)_2O_{1/2}$ and also T units of formulae $MeSiO_{3/2}$, $MeSi(OR^4)O_{2/2}$ and $MeSi(OR^4)_2O_{1/2}$, wherein Me represents methyl, Ph represents phenyl and $R^4$ represents hydrogen or optionally halogen-substituted alkyl radicals having 1 to 10 carbon atoms.

Further preferred examples of the silicone resins (B) employed according to the invention are organopolysiloxane resins consisting substantially, preferably exclusively, of units selected from T units of formulae $PhSiO_{3/2}$, $PhSi(OR^4)O_{2/2}$ and $PhSi(OR^4)_2O_{1/2}$, T units of formulae $MeSiO_{3/2}$, $MeSi(OR^4)O_{2/2}$ and $MeSi(OR^4)_2O_{1/2}$ and also D units of formulae $Me_2SiO_{2/2}$ and $Me_2Si(OR^4)O_{1/2}$, wherein Me represents methyl, Ph represents phenyl and $R^4$ represents hydrogen or optionally halogen-substituted alkyl radicals having 1 to 10 carbon atoms, preferably unsubstituted alkyl radicals having 1 to 4 carbon atoms, having a molar ratio of phenylsilicone units to methylsilicone units of 0.5 to 4.0. The content of D units in these silicone resins is preferably below 10% by weight.

Particularly preferred examples of the silicone resins (B) employed according to the invention are organopolysiloxane resins consisting to an extent of 80%, preferably to an extent of 90%, and in particular exclusively, of T units of formulae $PhSiO_{3/2}$, $PhSi(OR^4)O_{2/2}$ and $PhSi(OR^4)_2O_{1/2}$, wherein Ph represents phenyl and $R^4$ represents hydrogen or optionally halogen-substituted alkyl radicals having 1 to 10 carbon atoms, preferably unsubstituted alkyl radicals having 1 to 4 carbon atoms, in each case based on the totality of units.

It is preferable when the silicone resins (B) employed according to the invention have an average molar mass (number-average) $M_n$ of at least 400 g/mol and more preferably of at least 600 g/mol. The average molar mass $M_n$ is preferably at most 400,000 g/mol, more preferably at most 10,000 g/mol, and in particular at most 3000 g/mol.

The silicone resins (B) employed according to the invention may be either solid or liquid at 23° C. and 1000 hPa, wherein silicone resins (B) are preferably liquid. It is preferable when the silicone resins (B) have a viscosity at 23° C. of 10 to 100,000 mPas, preferably from 50 to 50,000 mPas, in particular from 100 to 20,000 mPas.

The silicone resins (B) employed according to the invention preferably have a polydispersity ($M_w/M_n$) of not more than 5, preferably not more than 3.

Similarly to the number-average molar masses $M_n$, the mass-average molar mass $M_w$ is likewise determined by size exclusion chromatography (SEC) against a polystyrene standard, in THF, at 60° C., at a flow rate of 1.2 ml/min and with RI detection (refractive index detector) in a Styragel HR3-HR4-HR5-HR5 column set from Waters Corp. USA with an injection volume of 100 µL.

The silicone resins (B) may be employed either in pure form or else in the form of a mixture with a suitable solvent (BL).

Employable solvents (BL) include any compounds unreactive toward the components (A) and (B) at room temperature and having a boiling point <250° C. at 1013 mbar.

Examples of optionally employed solvents (BL) are ethers, for example diethyl ether, methyl t-butyl ether, ether derivatives of glycol and THF; esters, for example ethyl acetate, butyl acetate and glycol esters; aliphatic hydrocarbons, for example pentane, cyclopentene, hexane, cyclohexane, heptane, octane or else longer-chain branched and unbranched alkanes; ketones, for example acetone and methyl ethyl ketone; aromatics, for example toluene, xylene, ethylbenzene and chlorobenzene; or else alcohols, for example methanol, ethanol, glycol, propanol, isopropanol, glycerol, butanol, isobutanol and t-butanol.

While many commercially available resins (B), for example the resins SILRES® SY 231, SILRES® IC 231, SILRES® IC 368, SILRES® IC 678 or SILRES® BS 1268 from Wacker Chemie AG, Munich, Germany, are liquid at 23° C. and 1013 hPa, they nonetheless contain as a consequence of manufacture small amounts of solvent (BL), in particular toluene. The abovementioned resins thus contain about 0.1% by weight of toluene based on the total weight of the resin.

Toluene-free resins (B) are likewise commercially available, for example GENIOSIL® LX 678 or GENIOSIL® LX 368 from Wacker Chemie AG, Munich, Germany.

One preferred embodiment of the invention comprises employing as component (B) silicone resins containing less than 0.1% by weight, more preferably less than 0.05% by weight, yet more preferably less than 0.02% by weight, and in particular less than 0.01% by weight, of aromatic solvents (BL).

A particularly preferred embodiment of the invention comprises employing as component (B) silicone resins (B) which, save for alcohols $R^4OH$ contain less than 0.1% by weight, more preferably less than 0.05% by weight, yet more preferably less than 0.02% by weight, and in particular less than 0.01% by weight, of solvent (BL), wherein $R^4$ is as defined hereinabove.

A very particularly preferred embodiment of the invention comprises employing as component (B) silicone resins which, save for alcohols $R^4OH$, contain no solvent (BL) whatsoever, wherein $R^4$ is as defined hereinabove and alcohols $R^4OH$ are preferably present in amounts of preferably not more than 5% by weight, more preferably 0 to 1% by weight, generally as a consequence of manufacture.

The silicone resins (B) employed according to the invention are commercially available products or may be produced by methods commonly used in silicon chemistry.

The compounds (C1) or (C2) are compounds producible in the same way as the compounds (A) except that polymers having polymer radicals Y which have correspondingly higher molecular masses and/or aromatic structural elements having nitrogen or oxygen atoms bonded directly to the aromatics are employed here. Examples of silane-terminated polymers (C1) are inter alia products obtainable under the designations GENIOSIL® STP-E10, GENIOSIL® STP-E15, GENIOSIL® STP-E30 or GENIOSIL® STP-E35 from Wacker Chemie AG, Munich, Germany.

When the compositions (M) according to the invention contain compounds (C1) and/or (C2), the amounts are preferably altogether not more than 10 parts by weight, more preferably altogether not more than 5 parts by weight, in each case based on 100 parts by weight of the composition (M) according to the invention. It is most preferable when the compositions (M) according to the invention contain neither compound (C1) nor compound (C2).

In addition to the employed components (A), (B) and the optionally employed components (C1) and (C2), the compositions (M) according to the invention may contain any further substances which have hitherto been employed in crosslinkable compositions, and which are distinct from components (A), (B), (C1) and (C2), such as for example nitrogen-containing organosilicon compounds (D), catalysts (E), adhesion promoters (F), water scavengers (G), fillers (H), additives (I) and admixture agents (J).

It is preferable when component (D) represents organosilicon compounds containing units of formula

$$D_hSi(OR^7)_gR^6_fO_{(4-f-g-h)/2} \qquad (III),$$

in which
$R^6$ may be identical or different and represents a monovalent, optionally substituted SiC-bonded, nitrogen-free organic radical,
$R^7$ may be identical or different and represents hydrogen or optionally substituted hydrocarbon radicals,
D may be identical or different and represents a monovalent, SiC-bonded radical having at least one nitrogen atom not bonded to a carbonyl group (C=O),
f is 0, 1, 2 or 3, preferably 1,
g is 0, 1, 2 or 3, preferably 1, 2 or 3, more preferably 1 or 3, and
h is 0, 1, 2, 3 or 4, preferably 1, with the proviso that the sum of f+g+h is less than or equal to 4 and at least one radical D is present per molecule.

The organosilicon compounds (D) optionally employed according to the invention may be either silanes, i.e. compounds of formula (III) where f+g+h=4, or siloxanes, i.e. compounds containing units of formula (III) where f+g+h≤3, silanes being preferred.

Examples of radical $R^6$ are the examples recited for R.

Radical $R^6$ preferably represents optionally halogen-substituted hydrocarbon radicals having 1 to 18 carbon atoms, more preferably hydrocarbon radicals having 1 to 5 carbon atoms, and in particular methyl.

Examples of optionally substituted hydrocarbon radicals $R^7$ are the examples recited for radical R.

The radicals $R^7$ are preferably hydrogen and optionally halogen-substituted hydrocarbon radicals having 1 to 18 carbon atoms, more preferably hydrogen and hydrocarbon radicals having 1 to 10 carbon atoms, and in particular methyl or ethyl radicals.

Examples of radicals D are radicals of formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C_7H_{15}NH(CH_2)_3$—, $H_2N(CH_2)_4$—, $H_2N$—$CH_2$—$CH(CH_3)$—$CH_2$—, $H_2N(CH_2)_5$—, cyclo-$C_5H_9NH(CH_2)_3$—, cyclo-$C_6H_{11}NH(CH_2)_3$—, phenyl-$NH(CH_2)_3$—, $(CH_3)_2N(CH_2)_3$—, $(C_2H_5)_2N(CH_2)_3$—, $(C_3H_7)_2N(CH_2)_3$—, $(C_4H_9)_2N(CH_2)_3$—, $(C_5H_{11})_2N(CH_2)_3$—, $(C_6H_{13})_2N(CH_2)_3$—, $(C_7H_{15})_2N(CH_2)_3$—, $H_2N(CH_2)$—, $H_2N(CH_2)_2NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-$NH(CH_2)$—, $(CH_3)_2N(CH_2)$—, $(C_2H_5)_2N(CH_2)$—, $(C_3H_7)_2N(CH_2)$—, $(C_4H_9)_2N(CH_2)$—, $(C_5H_{11})_2N(CH_2)$—, $(C_6H_{13})_2N(CH_2)$—, $(C_7H_{15})_2N(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$— and $(C_2H_5O)_2(CH_3)Si(CH_2)_3NH(CH_2)_3$— and reaction products of the abovementioned primary amino groups with compounds containing double bonds or epoxy groups reactive toward primary amino groups.

Radical D is preferably $H_2N(CH_2)_3$—, $H_2N(CH_2)_2NH(CH_2)_3$— or cyclo-$C_6H_{11}NH(CH_2)_3$—.

Examples of silanes of formula (III) optionally employed according to the invention are $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_3$, $H_2N(CH_2)_2NH(CH_2)_3$—$Si(OH)_2CH_3$, $H_2N(CH_2)_2NH(CH_2)_2NH(CH_2)_3$—$Si(OCH_3)_3$, $H_2N(CH_2)_2NH(CH_2)_2NH(CH_2)_3$—$Si(OC_2H_5)_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$, cyclo-$C_6H_{11}NH(CH_2)_3$—$Si(OH)_2CH_3$, phenyl-$NH(CH_2)_3$—$Si(OCH_3)_3$, phenyl-$NH(CH_2)_3$—$Si(OC_2H_5)_3$, phenyl-$NH(CH_2)_3$—$Si(OCH_3)_2CH_3$, phenyl-$NH(CH_2)_3$—$Si(OC_2H_5)_2CH_3$, phenyl-$NH(CH_2)_3$—$Si(OH)_3$, phenyl-$NH(CH_2)_3$—$Si(OH)_2CH_3$, $HN((CH_2)_3$—$Si(OCH_3)_3)_2$, $HN((CH_2)_3$—$Si(OC_2H_5)_3)_2$, $HN((CH_2)_3$—$Si(OCH_3)_2CH_3)_2$, $HN((CH_2)_3$—$Si(OC_2H_5)_2CH_3)_2$, cyclo-$C_6H_{11}NH(CH_2)$—$Si(OCH_3)_3$, cyclo-$C_6H_{11}NH(CH_2)$—$Si(OC_2H_5)_3$, cyclo-$C_6H_{11}NH(CH_2)$—$Si(OCH_3)_2CH_3$, cyclo-$C_6H_{11}NH(CH_2)$—$Si(OC_2H_5)_2CH_3$, cyclo-$C_6H_{11}NH(CH_2)$—$Si(OH)_3$, cyclo-$C_6H_{11}NH(CH_2)$—$Si(OH)_2CH_3$, phenyl-$NH(CH_2)$—$Si(OCH_3)_3$, phenyl-$NH(CH_2)$—$Si(OC_2H_5)_3$, phenyl-$NH(CH_2)$—$Si(OCH_3)_2CH_3$, phenyl-$NH(CH_2)$—$Si(OC_2H_5)_2CH_3$, phenyl-$NH(CH_2)$—$Si(OH)_3$ and phenyl-$NH(CH_2)$—$Si(OH)_2CH_3$ and partial hydrolysates thereof, wherein $H_2N(CH_2)_3$–$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OCH_3)_2CH_3$, $H_2N(CH_2)_2NH(CH_2)_3$—$Si(OC_2H_5)_3$, $H_2N(CH_2)_2NH(CH_2)_3$—$Si(OC_2H_5)_2CH_3$ or in each case the partial hydrolysates thereof, are particularly preferred.

The organosilicon compounds (D) optionally employed according to the invention may, in the compositions (M) according to the invention, also perform the function of a curative catalyst or cocatalyst.

The organosilicon compounds (D) optionally employed according to the invention may further act as adhesion promoters and/or as water scavengers.

The organosilicon compounds (D) optionally employed according to the invention are commercially available products or are producible by processes commonly used in chemistry.

When the compositions (M) according to the invention contain component (D), the amounts are preferably 0.1 to 40 parts by weight, more preferably 0.2 to 30 parts by weight, and in particular 0.1 to 5 parts by weight, in each case based on 100 parts by weight of the total composition (M) according to the invention. The compositions (M) according to the invention preferably contain component (D).

The catalysts (E) optionally employed in the compositions (M) according to the invention may be any desired hitherto-known catalysts for compositions curable by silane condensation.

Examples of metal-containing curative catalysts (E) are organic titanium and tin compounds, for example titanic acid esters, such as tetrabutyl titanate, tetrapropyl titanate, tetraisopropyl titanate and titanium tetraacetylacetonate; tin compounds, such as dibutyltin dilaurate, dibutyltin maleate, dibutyltin diacetate, dibutyltin dioctanoate, dibutyltin acetylacetonate, dibutyltin oxides and corresponding dioctyltin compounds.

Examples of metal-free curative catalysts (E) are basic compounds, such as triethylamine, tributylamine, 1,4-diazabicyclo[2,2,2]octane, 1,5-diazabicyclo[4.3.0]non-5-ene, 1,8-diazabicyclo[5.4.0]undec-7-ene, N,N-bis(N,N-dimethyl-2-amino-ethyl)methylamine, N,N-dimethylcyclohexylamine, N,N-dimethylphenylamine and N-ethylmorpholinine or salts of carboxylic acids, such as sodium acetate.

Likewise employable as catalyst (E) are acidic compounds, such as phosphoric acid and the partially esterified derivatives thereof, toluenesulfonic acid, sulfuric acid, nitric acid or else organic carboxylic acids, for example acetic acid and benzoic acid.

When the compositions (M) according to the invention contain catalysts (E), the amounts are preferably 0.01 to 20 parts by weight, more preferably 0.05 to 5 parts by weight, in each case based on 100 parts by weight of the composition (M) according to the invention.

In the compositions according to the invention, metal-containing catalysts (E), and in particular tin-containing catalysts, may preferably be eschewed when the component (A) consists entirely or at least partially, i.e. to an extent of at least 40% by weight, preferably to an extent of at least 50% by weight, of compounds of formula (I) in which b is 1 and $R^1$ represents hydrogen. This embodiment of the invention without metal-containing catalysts and in particular without tin-containing catalysts is particularly preferred.

The adhesion promoters (F) optionally employed in the compositions (M) according to the invention may be any desired adhesion promoters hitherto described for systems curable by silane condensation.

Examples of adhesion promoters (F) are epoxysilanes, such as 3-glycidoxypropyltrimethoxysilanes, 3-glycidoxypropylmethyldimethoxysilane, 3-glycidoxypropyltriethoxysilane or 3-glycidoxypropylmethyldiethoxysilane, 2-(3-triethoxysilyl-propyl)maleic anhydride, N-(3-trimethoxysilylpropyl)urea, N-(3-triethoxysilylpropyl)urea, N-(trimethoxysilylmethyl)urea, N-(methyldimethoxysilylmethyl)urea, N-(3-triethoxysilylmethyl)-urea, N-(3-methyldiethoxysilylmethyl)urea, O-methylcarbamatomethylmethyldimethoxysilane, O-methylcarbamatomethyltrimethoxysilane, O-ethylcarbamatomethylmethyldiethoxysilane, O-ethyl-carbamatomethyltriethoxysilane, 3-methacryloyloxypropyl-trimethoxysilane, methacryloyloxymethyltrimethoxysilane, methacryloyloxymethylmethyldimethoxysilane, methacryloyloxymethyltriethoxysilane, methacryloyloxymethylmethyldiethoxysilane, 3-acryloyloxypropyltrimethoxysilane, acryloyloxymethyltrimethoxysilane, acryloyloxymethylmethyldimethoxysilanes, acryloyloxymethyltriethoxysilane and acryloyloxymethylmethyldiethoxysilane and also partial hydrolyzates thereof.

When the compositions (M) according to the invention contain adhesion promoters (F), the amounts concerned are preferably 0.5 to 30 parts by weight, more preferably 1 to 10 parts by weight, in each case based on 100 parts by weight of the composition (M) according to the invention.

In a particularly preferred embodiment of the invention, the coating compositions according to the invention contain not only epoxysilanes, in particular 3-glycidoxypropyltrimethoxysilane, 3-glycidoxypropylmethyldimethoxysilane, 3-glycidoxypropyltriethoxysilane or 3-glycidoxypropylmethyldiethoxysilane or partial hydrolyzates thereof, but also the compounds (D) described as preferred, in particular $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OCH_3)_2CH_3$, $H_2N(CH_2)_2NH(CH_2)_3$—$Si(OC_2H_5)_3$, $H_2N(CH_2)_2NH(CH_2)_3$—$Si(OC_2H_5)_2CH_3$ or partial hydrolyzates thereof, in the amounts specified as preferred in each case.

Especial preference is given to one embodiment of the invention in which the coating compositions according to the invention contain not only epoxy silanes, in particular 3-glycidoxypropyltrimethoxysilane, 3-glycidoxypropylmethyldimethoxysilane, 3-glycidoxypropyltriethoxysilane or 3-glycidoxypropylmethyldiethoxysilane or partial hydrolyzates thereof, but also the compounds (D) described as preferred and having a dialkoxysilyl group, in particular $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$ or partial hydrolyzates thereof, in the amounts specified as preferred in each case.

The water scavengers (G) optionally employed in the coating compositions (M) according to the invention may be any desired water scavengers hitherto described for systems curable by silane condensation.

Examples of water scavengers (G) are silanes such as vinyltrimethoxysilane, vinyltriethoxysilane, vinylmethyldimethoxysilane, tetraethoxysilane, O-methylcarbamatomethylmethyldimethoxysilane, O-methylcarbamatomethyltrimethoxysilane, O-ethylcarbamatomethylmethyldiethoxysilane, O-ethylcarbamato-methyltriethoxysilane and/or their partial condensates and also orthoesters, such as 1,1,1-trimethoxyethane, 1,1,1-triethoxyethane, trimethoxymethane and triethoxymethane, wherein vinyltrimethoxysilane is preferred.

When the coating compositions (M) according to the invention contain water scavengers (G), the amounts concerned are preferably 0.5 to 30 parts by weight, more preferably 1 to 10 parts by weight, in each case based on 100 parts by weight of crosslinkable composition (M).

The fillers (H) optionally employed in the compositions according to the invention may be any desired hitherto-known fillers.

Examples of fillers (H) are nonreinforcing fillers, i.e. fillers having a BET surface area of preferably up to 50 $m^2/g$, such as quartz, in particular quartz flour, diatomaceous earth, calcium silicate, zirconium silicate, talc, kaolin, zeolites, metal oxide powders, such as oxides of aluminum, of titanium, of iron or of zinc and/or mixed oxides thereof, barium sulfate, calcium carbonate, gypsum, silicon nitride, silicon carbide, boron nitride, glass powders and plastics powders, such as polyacrylonitrile powders; reinforcing fillers, i.e. fillers having a BET surface area of more than 50 $m^2/g$, such as fumed silica, precipitated silica, precipitated chalk, carbon black, such as furnace and acetylene blacks and silicon-aluminum mixed oxides of large BET surface area or aluminum trihydroxide. The recited fillers may be in a hydrophobicized state, for example as a result of treatment with organosilanes and/or organosiloxanes or with stearic acid or as a result of etherification of hydroxyl groups into alkoxy groups. The compositions according to the invention may contain just one filler type or else a mixture of a plurality of different fillers (H).

The optionally employed fillers (H) are preferably quartz flour, calcium carbonate, talc, aluminum trihydroxide or silica, wherein quartz flour is particularly preferred.

Optionally employed fillers (H) preferably have a moisture content of below 1% by weight, more preferably of below 0.5% by weight.

When the compositions according to the invention contain fillers (H), the amounts are preferably 5 to 90 parts by weight, more preferably 10 to 80 parts by weight, and in particular 15 to 70 parts by weight, in each case based on 100 parts by weight of composition (M) according to the invention.

The additives (I) optionally employed in the compositions (M) according to the invention may be any desired hitherto-known additives typical for silane-crosslinking systems.

The additives (I) optionally employed according to the invention are compounds distinct from the hitherto recited components, preferably antioxidants, UV stabilizers, for example UV absorbers or so-called HALS compounds, fungicides, biocides or in-can preservatives, commercially available antifoams and/or deaerators, for example SILFOAM® SC 120, SILFOAM® 124 or SILFOAM® 155 from Wacker Chemie AG, Munich, Germany or else products from BYK (Wesel, Germany), commercially available wetting agents, for example from BYK (Wesel, Germany), pigments, for example titanium dioxide or organic color pigments, or matting agents, for example Deuteron M 648, Deuteron Pergolak M3 or else the various Deuteron ST-S products.

The optionally employed additives (I) are preferably matting agents.

Matting agents are preferably employed in amounts of at least 2.5% by weight, in particular of at least 5% by weight. Matting agents are preferably employed in amounts of at most 60% by weight, in particular of at most 50% by weight, in each case based on the total weight of the composition according to the invention.

When the coatings according to the invention contain additives (I), the amounts are preferably 0.01 to 30 parts by weight, more preferably 0.1 to 20 parts by weight, in each case based on 100 parts by weight of composition (M) according to the invention. The coating compositions according to the invention preferably contain additives (I).

The admixture agents (J) optionally employed according to the invention are preferably tetraalkoxysilanes, for example tetraethoxysilane, and/or partial condensates thereof, plasticizers, reactive diluents, flame retardants or organic solvents.

Examples of plasticizers (J) are phthalic esters, for example dioctyl phthalate, diisooctyl phthalate and diundecyl phthalate; perhydrogenated phthalic esters, for example diisononyl 1,2-cyclohexanedicarboxylate and dioctyl 1,2-cyclohexanedicarboxylate; adipic esters, for example dioctyl adipate; benzoic esters; glycol esters; esters of saturated alkanediols, for example 2,2,4-trimethyl-1,3-pentanediol monoisobutyrates and 2,2,4-trimethyl-1,3-pentanediol diisobutyrates; phosphoric esters; sulfonic esters; polyesters; polyethers, for example polyethylene glycols and polypropylene glycols having molar masses of preferably 1000 to 10,000 g/mol; polystyrenes; polybutadienes; polyisobutylenes; paraffinic hydrocarbons; and high molecular weight branched hydrocarbons.

It is preferable when the coating compositions (M) according to the invention contain no plasticizers (J).

Preferred reactive diluents (J) are compounds which contain alkyl chains having 6 to 40 carbon atoms and have a group reactive toward the compounds (A), for example isooctyltrimethoxysilane, isooctyltriethoxysilane, n-octyltrimethoxysilane, n-octyltriethoxysilane, decyltrimethoxysilane, decyltriethoxysilane, dodecyltrimethoxysilane, dodecyltriethoxysilane, tetradecyltrimethoxysilane, tetradecyltriethoxysilane, hexadecyltrimethoxysilane or hexadecyltriethoxysilane.

Employable flame retardants (J) are all typical flame retardants, in particular halogenated compounds and derivatives, in particular (partial) esters of phosphoric acid distinct from component (E).

Examples of organic solvents (J) are the compounds already recited hereinabove as solvents (BL), preferably alcohols, in particular ethanol.

The coating compositions (M) according to the invention preferably contain less than 50 parts by weight, more preferably less than 10 parts by weight, in particular less than 5 parts by weight, of organic solvents, in each case based on 100 parts by weight of the composition (M) according to the invention. In a particularly preferred embodiment, the compositions according to the invention are free from organic solvents.

When the coating compositions according to the invention contain components (J), the amounts are preferably 0.1 to 50 parts by weight, more preferably 0.5 to 20 parts by weight, and in particular 1 to 10 parts by weight, in each case based on 100 parts by weight of composition (M) according to the invention.

The coating compositions (M) according to the invention are by preference such compositions containing
- (A) 100 parts by weight of compounds of formula (I) and
- (B) at least 100 parts by weight of silicone resins containing units of formula (II) and at least one further component selected from
- (D) nitrogen-containing organosilicon compound,
- (E) catalysts,
- (F) adhesion promoters,
- (G) water scavengers,
- (H) fillers,
- (I) additives and
- (J) admixture agents.

The coating compositions according to the invention are preferably such compositions containing
- (A) 100 parts by weight of compounds of formula (I),
- (B) 100 to 1000 parts by weight of silicone resins containing units of formula (II),
- (C1) less than 100 parts by weight of compounds of formula (I'),
- (C2) less than 100 parts by weight of compounds of formula (I"),
- (D) 0.1 to 40 parts by weight of nitrogen-containing organosilicon compound, optionally
- (E) catalysts, optionally
- (F) adhesion promoters, optionally
- (G) water scavengers, optionally
- (H) fillers, optionally
- (I) additives and optionally
- (J) admixture agents.

The coating compositions according to the invention are particularly preferably such compositions containing
- (A) 100 parts by weight of compounds of formula (I),
- (B) 150 to 2500 parts by weight of silicone resins consisting of units of formula (II),
- (C1) less than 50 parts by weight of compounds of formula (I'),
- (C2) less than 50 parts by weight of compounds of formula (I"),
- (D) 0.5 to 30 parts by weight of nitrogen-containing organosilicon compound, optionally
- (E) catalysts, optionally
- (F) adhesion promoters, optionally
- (G) water scavengers, optionally
- (H) fillers, optionally
- (I) additives and optionally
- (J) admixture agents.

The coating compositions according to the invention are in particular such compositions containing
- (A) 100 parts by weight of compounds of formula (I),
- (B) 200 to 1500 parts by weight of silicone resins consisting of units of formula (II),
- (C1) less than 50 parts by weight of compounds of formula (I'),
- (C2) less than 50 parts by weight of compounds of formula (I"),
- (D) 0.5 to 15 parts by weight of component (D), optionally
- (E) catalysts, optionally
- (F) adhesion promoters, optionally
- (G) water scavengers, optionally
- (H) fillers, optionally
- (I) additives and
- (J) admixture agents.

The coating compositions according to the invention preferably contain no further constituents other than the recited components (A) to (J).

The components employed according to the invention may in each case be one type of such a component or else a mixture of at least two types of a respective component.

The production of the coating compositions according to the invention may be carried out in any desired manner known per se, such as for instance by methods and mixing processes such as are customary for producing moisture-curing compositions. The sequence in which the various constituents are mixed with one another may be varied as desired.

The present invention further provides a process for producing the composition according to the invention by mixing the individual components in any desired sequence.

This mixing may be carried out at room temperature and the pressure of the ambient atmosphere, i.e. about 900 to 1100 hPa.

However, if desired this mixing may also be carried out at higher temperatures, for example at temperatures in the range from 30° C. to 130° C. It is also possible to carry out the mixing intermittently or permanently under reduced pressure, for example at 30 to 500 hPa absolute pressure, to remove volatile compounds and/or air.

In a preferred mixing, the mixing is carried out largely or completely in the absence of water and atmospheric humidity.

The process according to the invention may be performed continuously or discontinuously.

The coating compositions according to the invention are preferably one-component compositions which are storable in the absence of water and are crosslinkable at room temperature on admittance of water. However, the coating compositions according to the invention may also be part of two-component crosslinking systems where OH-containing compounds, such as water, are added in a second component.

The customary water content of air is sufficient to crosslink the coating compositions according to the invention. The crosslinking of the coating compositions according to the invention is preferably carried out at room temperature. If desired, said crosslinking may also be carried out at temperatures higher or lower than room temperature, for example at −5° C. to 15° C. or at 30° C. to 80° C., and/or using concentrations of water which exceed the normal water content of air.

The crosslinking is preferably performed at a pressure of 100 to 1100 hPa, in particular at the pressure of the ambient atmosphere, i.e. about 900 to 1100 hPa.

The invention further provides shaped articles produced by crosslinking of the compositions according to the invention.

The shaped articles are preferably coatings. The cured coatings preferably have a thickness of 0.01 to 3 mm, more preferably 0.05 to 1.5 mm, and in particular 0.1 to 1 mm.

The invention further provides a process for producing coatings in which the coating composition according to the invention is applied to at least one substrate and subsequently allowed to undergo crosslinking.

The substrate is preferably wood or a mineral material, more preferably wood, concrete or screed surfaces, in particular wood, concrete or screed floors.

The coatings according to the invention have the advantage of good soiling repellency. Even severely staining contaminants such as coffee, balsamic vinegar, red wine, ketchup or else waste oil may be residuelessly removed even after exposure times of several hours.

After curing, the coating compositions according to the invention exhibit a high tensile bond strength on dry and moist concrete, screed and mastic asphalt, preferably of at least 1.5 N/mm$^2$.

The tensile bond strength is determined according to DIN EN 13813 when under defined conditions (inter alia measurement area, temperature, withdrawal rate) a ram is adhesively bonded to the coating of the relevant test specimen (so-called test ram) perpendicular to the substrate surface, and is uniformly and slowly withdrawn until tearoff (breakage) is obtained using a tensile test machine.

The coatings according to the invention additionally exhibit a high pendulum hardness, good scratch resistance and also good abrasion resistance and good chemical resistance.

The coating compositions according to the invention have the advantage that they are easy to produce.

The crosslinkable coating compositions according to the invention have the advantage that they feature a very high storage stability and a high crosslinking rate.

The crosslinkable coating compositions according to the invention further have the advantage that they are easy to use.

The coatings according to the invention are preferably floor coatings. They are particularly preferably floor coatings applied to a subfloor made of concrete, cement or screed.

In a further preferred embodiment of the invention, the coating compositions according to the invention are employed as parquet lacquers. The coatings according to the invention here exhibit the additional advantage of good "grain enhancement" of the wood. This means the coatings according to the invention have a color depth-enhancing effect and also amplify the natural grain of the wood.

In a further preferred embodiment of the invention, the crosslinkable compositions are employed as coatings for decorative natural or artificial stone surfaces. Here too, the coatings according to the invention exhibit a distinct color depth enhancement.

In the process according to the invention, application may be carried out by any desired hitherto-known processes, for example pouring, spackling, rolling, spraying and brushing.

The coating compositions according to the invention may be applied directly to the subfloor. It is preferable when the subfloor is subjected to cleaning before application of the coating composition according to the invention and this should comprise removal of in particular loose material, lichen, algae or plant growth, fat, paraffin, release agents and any other impurities. Pores, cavities or gravel pockets should preferably be filled before application of the coating. It is in principle advantageous for good adhesion when the surface has a certain roughness and grip.

In the examples described below, all reported viscosities relate to a temperature of 23° C. Unless otherwise stated, the examples which follow are performed at a pressure of the ambient atmosphere, i.e. at about 1000 hPa, and at room temperature, i.e. at about 23° C., or at a temperature which is established upon combining the reactants at room temperature without additional heating or cooling and at a relative humidity of about 50%. Furthermore, unless otherwise stated, all reported parts and percentages are based on weight.

EXAMPLES

The examples which follow employed the following substances: GENIOSIL® STP-E10: silane-terminated polypropylene glycol having an average molar mass ($M_n$) of 12,000 g/mol and end groups of formula —O—C(=O)—NH—CH$_2$—SiCH$_3$(OCH$_3$)$_2$ (commercially available from Wacker Chemie AG, Munich, Germany).

GENIOSIL® GF 9: N-(2-aminoethyl)-3-aminopropyltrimethoxysilane (commercially available from Wacker Chemie AG, Munich, Germany).

GENIOSIL® GF 80: 3-glycidoxypropyltrimethoxysilane (commercially available from Wacker Chemie AG, Munich, Germany).

DBU: 1,8-diazabicyclo-5.4.0-undec-7-ene.

Deaerator SILFOAM® SC 124: water-free, low-viscosity, liquid antifoam compound based on polydimethyl siloxane having a dynamic viscosity of less than 4000 mPas (Brookfield spindle 2; 2.5 rpm; at 25° C.)

Quartz flour W8 (1-100 μm): quartz flour having a grain size of 0.001-0.16 mm, an average grain size of 0.026 mm, a grain fraction >10 μm of 76% by weight, a grain fraction >20 μm of 59% by weight, a grain fraction >30 μm of 44% by weight, a grain fraction >40 μm of 40% by weight and a poured density of 0.9 kg/l.

Kronos® 2190: titanium dioxide having a TiO$_2$ content >95%, a standard classification according to DIN EN ISO 591-1) of R2, the color index Pigment White 6, and a poured density of 4.1 kg/l and an oil number of 18 g/100 g (commercially available from Kronos, USA Dallas).

Kronos® 2310: titanium dioxide having a TiO$_2$ content >92.5%, a standard classification according to DIN EN ISO 591-1) of R2, the color index Pigment White 6, and a poured density of 4.0 kg/l and an oil number of 17 g/100 g (commercially available from Kronos, USA Dallas).

TINUVIN® B 75: mixture of 20% Irganox® 1135 (CAS-No. 125643-61-0), 40% Tinuvin® 571 (CAS-No. 23328-53-2) and 40% Tinuvin® 765 (CAS-No. 41556-26-7) (commercially available from BASF SE, Ludwigshafen, Germany).

Deuteron® M 648: matting agent having an oil number of 206 g/100 g, a poured density of 120 g/l and an average particle size d50 of 6 μm (commercially available from Deuteron, Achim, Germany).

Deuteron® Pergopak M3: matting agent having an oil number of 333 g/100 g, a poured density of 140 g/l and an average particle size d50 of 7 μm (commercially available from Deuteron, Achim, Germany).

Printex 300 carbon black: carbon black having a blackness value M of 242 (measured according to DIN 55979), a BET surface area of about 80 m$^2$/g, an average particle size of about 27 nm and an oil number of about 68 ml/100 g (commercially available from Orion, Frankfurt, Germany).

Production of Compound A

In a 2 l four-necked flask fitted with a dropping funnel, Liebig cooler, KPG stirrer and thermometer, 1080 g of a polypropylene glycol having a number-average molecular mass of 4000 g/mol (Acclaim PPG 4200, commercially available from Covestro AG, Leverkusen, Germany) are initially charged, heated to 80° C. and dried for 2 hours at a pressure of 10 mbar.

The vacuum is broken with nitrogen and over 15 min 91.2 g of α-isocyanatomethylmethyldimethoxysilane (GENIOSIL® XL 42, commercially available from Wacker Chemie AG, Munich, Germany) are added dropwise with stirring. The temperature remains at 80° C. 0.17 g of bismuth- and zinc-containing catalyst (commercially available under the designation "Borchi-Kat VP 244" from Borchers, Langenfeld, Germany) are then added. This results in a slight warming of the reaction mixture (<5° C.) The mixture is then stirred at 80° C. for 2 h. Afterwards, the IR spectrum of the reaction mixture still exhibits a small isocyanate peak.

The mixture is allowed to cool to 50° C. and 1.6 g of methanol are added at this temperature in order to eradicate the remaining isocyanate. A subsequently acquired IR spectrum confirms freedom from NCO groups.

Production of the Phenylsilicone Resin B

In a 2 l four-necked flask fitted with a dropping funnel, Liebig cooler, KPG stirrer and thermometer, 1000 g of phenyltrimethoxysilane are initially charged at room temperature and with stirring admixed with 20 g of a 20% aqueous hydrochloric acid. The mixture is then heated to a temperature of 65-68° C. until a slight reflux is established. Then, under reflux, a mixture of 74 g of water and 40 g of methanol is added uniformly over 30 min. Once addition has ended, the mixture is stirred for a further 10 min under reflux and then cooled to room temperature.

The reaction mixture is left to stand at room temperature for about 16 h before 60 g of sodium hydrogencarbonate are added with stirring, the mixture is stirred for 30 min, and the resulting solid is then separated by filtration. Finally, the low boilers (substantially methanol) are removed by distillation. This comprises initially removing about 80-90% of the distillate quantity for removal at 1013 mbar and a temperature of 120° C. and subsequently reducing the pressure to 10 mbar for distillative removal of the remaining low-boiling residues over the following 15-20 min.

This affords a phenylsilicone resin B having an average molar mass Mn of 1200 g/mol, a viscosity of 90 mPas at 23° C. and a content of methoxy groups of 18% based on the total resin composition.

Examples 1 to 7 (B1-B7) and Comparative Example 1 (VB 1): Production of 1K Coating Compositions All compounds are employed according to the weight ratios reported in table 1.

The coating compositions are produced by initially charging the phenyl silicone resin B, the production of which is described above, into a beaker having a diameter of 6.5 cm. The further components are then added in the sequence specified in table 1 from top to bottom, wherein each component is in each case introduced with a dissolver fitted with a V2A 40 mm dispersing disk from Pendraulik (Springe, Germany) at a speed of 1000 rpm. Finally, using the same dissolver disk the mixture is dispersed for a further 2 min at a speed of 2000 rpm.

The ready-to-use mixtures are each filled into airtightly sealable containers. In the absence of atmospheric humidity, said mixtures may be stored therein for at least 6 months. Provided that it contains fillers, i.e. the mixtures from examples 6 and 7, the mixture is stirred up immediately before use with a spatula until the mixture is homogeneous again.

TABLE 1

| | B1 | VB2 | B2 | B3 | B4 | B5 | B6 | B7 |
|---|---|---|---|---|---|---|---|---|
| Phenylsilicone resin B | 85.8 | 85.8 | 80.3 | 80.3 | 78.0 | 78.0 | 34.0 | 33.9 |
| Compound A | 10.0 | | 9.1 | 9.1 | 8.3 | 8.3 | 4.0 | 4.0 |
| GENIOSIL ® STP-E10 | | 10.0 | | | | | | |
| GENIOSIL ® GF 9 | 3.0 | 3.0 | 2.9 | 2.9 | 2.7 | 2.7 | 2.0 | 2.0 |
| DBU | 0.2 | 0.2 | 0.2 | 0.2 | | | | |

TABLE 1-continued

|  | B1 | VB2 | B2 | B3 | B4 | B5 | B6 | B7 |
|---|---|---|---|---|---|---|---|---|
| GENIOSIL® GF 80 |  |  | 1 | 1 |  |  |  |  |
| SILFOAM® SC 124 |  |  | 0.5 | 0.5 |  |  |  |  |
| Quartz flour W8 |  |  |  |  |  |  | 56 | 56 |
| Kronos® 2190 |  |  |  |  |  |  | 3 |  |
| Kronos® 2310 |  |  |  |  |  |  |  | 3 |
| TINUVIN® B 75 | 1 | 1 | 1 | 1 | 1 | 1 | 1 | 1 |
| Deuteron® M 648 |  |  |  | 5 |  | 10 |  |  |
| Deuteron® Pergopak M3 |  |  |  | 5 |  | 10 |  |  |
| Printex 300 carbon black |  |  |  |  |  |  |  | 0.1 |

All numerical values in table 1 represent amounts in [g].

Example 8: Determination of Properties of the Coatings from Examples 1 to 7 and Comparative Example 1

For application, the coatings are in each case applied to a concrete slab with a brush. The applied amount is about 180 g/m² for examples 1-5 and comparative example 1 and 250 g/m² for examples 6 and 7. After storage for 24 h under standard climatic conditions (23° C./50% atmospheric humidity), a second layer is applied, likewise with the brush, and once again using the same amount of material.

Skin Formation Time (SFT)

To determine the skin formation time, during the curing under standard climatic conditions every 5 min a dry laboratory spatula is carefully placed on the surface of the brushed-on coating and pulled in the upward direction. If material sticks to the spatula, a skin is yet to form. If sample no longer sticks to the spatula, a skin has formed and the time is recorded.

The average of the skin formation times from the first and the second application of the coating is reported in table 2.

Erichsen Hardness

For the hardness testing, the double-layered coating is stored for 7 days under standard climatic conditions. The hardness test itself is performed with an Erichsen hardness test pencil (hardness test pencil model 318S) where the tip of the pencil is scratched over the cured coating with a pressure that has previously been set to an appropriate value. The Erichsen hardness reported in table 2 represents the maximum pressure at which the Erichsen hardness test pencil still leaves behind no visible scratch.

To test the soiling propensity, the double-layered coating is stored under standard climatic conditions for 7 days. The soilings specified in table 2 are subsequently applied to the surface of the coating and left there for 24 h during which time the samples are stored under standard climatic conditions. Subsequent cleaning was carried out under running water, wherein in the case of dried-on soilings such as mustard or ketchup additional cleaning was carried out with a conventional household sponge. After drying, soiling evaluation was carried out according to EN 12720. A grade of 5 means that no soiling whatsoever was apparent, a grade of 4 represents just discernible soiling, which becomes ever more marked as the number reduces, down to a grade of 1, which represents a very severe soiling of the surface.

TABLE 2

|  | B1 | VB1 | B2 | B3 | B4 | B5 | B6 | B7 |
|---|---|---|---|---|---|---|---|---|
| Skin formation time [min] | 35 | 45 | 35 | 40 | 120 | 125 | 70 | 70 |
| Erichsen hardness [N] | 3 | 1 | 3 | 3 | 3 | 3 | 5 | 5 |
| Appearance | transparent, glossy |  | transparent, slightly silk matt |  | transparent, silk matt |  | white | grey |
| Gloss (20°) | 36% | 54% | 19.5% | 18.7% | 13.3% | 15.4% |  |  |
| Soiling propensity: |  |  |  |  |  |  |  |  |
| Water | 5 | 5 | 5 | 5 | 5 | 5 | 5 | 5 |
| Saltwater (20% NaCl) | 5 | 5 | 5 | 5 | 5 | 5 | 5 | 5 |
| Balsamic | 4 | 2 | 4 | 4 | 4 | 4 | 2 | 3 |
| Red wine | 5 | 5 | 5 | 5 | 5 | 5 | 5 | 5 |
| Ink | 5 | 5 | 5 | 5 | 5 | 5 | 5 | 5 |
| Butter | 5 | 5 | 5 | 5 | 5 | 5 | 5 | 5 |
| Olive oil | 5 | 5 | 5 | 5 | 5 | 5 | 5 | 5 |
| Coffee | 5 | 3 | 5 | 5 | 5 | 5 | 3 | 3 |
| Mustard | 5 | 2 | 5 | 5 | 5 | 5 | 3 | 3 |
| Ketchup | 5 | 2 | 5 | 5 | 5 | 5 | 5 | 5 |
| Petrol | 5 | 2 | 3 | 3 | 3 | 3 | 5 | 5 |
| Diesel | 5 | 5 | 5 | 5 | 5 | 5 | 5 | 5 |
| Floor cleaner (pH 10) | 4 | 3 | 5 | 5 | 5 | 5 | 5 | 5 |
| Cement residue remover | 5 | 2 | 5 | 5 | 5 | 5 | 5 | 5 |
| Cola | 5 | 5 | 5 | 5 | 5 | 5 | 5 | 5 |
| Sulfuric acid (20% strength) | 5 | 3 | 5 | 2 | 5 | 2 | 5 | 5 |
| Aqueous sodium hydroxide solution (20% strength) | 2 | 1 | 1 | 1 | 1 | 1 | 1 | 1 |
| Lactic acid (90% strength) | 4 | 3 | 5 | 5 | 5 | 5 | 4 | 4 |

TABLE 2-continued

|  | B1 | VB1 | B2 | B3 | B4 | B5 | B6 | B7 |
|---|---|---|---|---|---|---|---|---|
| Waste oil | 5 | 5 | 5 | 5 | 5 | 5 | 5 | 5 |
| Ethanol | 5 | 5 | 5 | 5 | 5 | 5 | 5 | 5 |
| Total | 94 | 73 | 93 | 90 | 93 | 90 | 88 | 89 |

The invention claimed is:

1. A crosslinkable floor coating composition (M), comprising:
   (A) 100 parts by weight of compounds of formula $$Y\text{—}[(CR^1{}_2)_b\text{—}SiR_a(OR^2)_{3-a}]_x \quad (I),$$

wherein
   Y is an x-valent polymer radical bonded via nitrogen, oxygen, sulfur or carbon to a carbon of the $(CR^1{}_2)$ group, and which has a number-average molecular mass of 200 to 10,000 g/mol and which contains no aromatic structural elements having nitrogen or oxygen atoms bonded directly to an aryl ring of the aromatic structure,
   R are identical or different and are monovalent, optionally substituted SiC-bonded hydrocarbon radicals,
   $R^1$ are identical or different and are hydrogen or a monovalent, optionally substituted hydrocarbon radical that may be attached to the carbon atom via nitrogen, phosphorus, oxygen, sulfur or a carbonyl group,
   $R^2$ are identical or different and are hydrogen or a monovalent, optionally substituted hydrocarbon radical,
   x is an integer from 1 to 10,
   a is identical or different and is 0, 1 or 2, and
   b is identical or different and is an integer from 1 to 10 and
   (B) at least 100 parts by weight of silicone resin(s) containing units of formula $$R^3{}_c(R^4O)_d R^5{}_e SiO_{(4-c-d-e)/2} \quad (II),$$

wherein
   $R^3$ are identical or different and are hydrogen, a monovalent, SiC-bonded, optionally substituted aliphatic hydrocarbon radical or a divalent, optionally substituted aliphatic hydrocarbon radical that bridges two units of formula (II),
   $R^4$ are identical or different and are hydrogen or a monovalent, optionally substituted hydrocarbon radical,
   $R^5$ are identical or different and represents a monovalent, SiC-bonded, optionally substituted aromatic hydrocarbon radical,
   c is 0, 1, 2 or 3,
   d is 0, 1, 2 or 3 and
   e is 0, 1 or 2,
   with the proviso that the sum of c+d+e is less than or equal to 3 and in at least 40% of the units of formula (II) the sum of c+e is 0 or 1,
   wherein
   the composition (M) contains less than 100 parts by weight of compounds (C1) of formula $$Y^1\text{—}[(CR^1{}_2)_b\text{—}SiR_a(OR^2)_{3-a}]_x \quad (I'),$$

wherein $Y^1$ is an x-valent polymer radical bonded via nitrogen, oxygen, sulfur or carbon which has a number-average molecular mass $M_n$ of more than 10,000 g/mol and R, $R^1$, $R^2$, a, b and x are as defined in formula (I) and in each case are identical or different.

2. The crosslinkable floor coating composition of claim 1, wherein the composition (M) contains less than 10 parts by weight of organic solvents based on 100 parts by weight of the composition (M) according to the invention.

3. The crosslinkable floor coating composition of claim 1, wherein the composition (M) contains less than 100 parts by weight of compounds (C2) of formula $$Y^2\text{—}[(CR^1{}_2)_b\text{—}SiR_a(OR^2)_{3-a}]_x \quad (I''),$$

wherein $Y^2$ is an x-valent polymer radical bonded via nitrogen, oxygen, sulfur or carbon which contains aromatic structural elements comprising nitrogen or oxygen atoms bonded directly to an aryl ring of the aromatic structural element and R, $R^1$, $R^2$, a, b and x are as defined in formula (I) and in each case are identical or different.

4. The crosslinkable floor coating composition as claimed in claim 1, wherein radical Y in formula (I) is a polyoxypropylene radical having a number-average molecular mass of 200 to 10,000 g/mol.

5. The crosslinkable floor coating composition of claim 1, wherein radical Y in formula (I) is a polyoxypropylene radical having a number-average molecular mass of 500 to 8000 g/mol.

6. The crosslinkable floor coating composition of claim 1, comprising, based on 100 parts by weight of component (A), at least 200 parts by weight of component (B).

7. The crosslinkable floor coating composition of claim 1, wherein said composition contains
   (A) 100 parts by weight of compounds of formula (I) and
   (B) at least 100 parts by weight of silicone resins containing units of formula (II) and at least one further component selected from:
   (D) nitrogen-containing organosilicon compound,
   (E) catalysts,
   (F) adhesion promoters,
   (G) water scavengers,
   (H) fillers,
   (I) additives and
   (J) admixture agents.

8. The crosslinkable floor coating composition of claim 1, wherein in the compounds (A) of formula (I), Y is a polyether, a polyester, a polyurethane or mixture thereof, bonded to the $[(CR^1{}_2)_b\text{—}SiR_a(OR^2)_{3-a}]$ groups by —O—, —O—C(=O)—NH—, and mixtures thereof.

9. The crosslinkable floor coating composition of claim 1, wherein Y is a polyether, polyester, polyurethane, or mixture thereof, bonded to the $[(CR^1{}_2)_b\text{—}SiR_a(OR^2)_{3-a}]$ groups by —O—C(=O)—NH— and —NH—C(=O)—NH groups, wherein of these two latter groups ≥85 mol percent are —O—C(=O)—NH— groups.

10. A process for producing the crosslinkable floor coating composition of claim 1, comprising mixing the individual components in any desired sequence.

11. A process for producing a floor coating in which a floor coating composition of claim 1 is applied to at least one substrate and subsequently allowed to undergo crosslinking.

12. A floor coating produced by crosslinking a composition of claim 1.

* * * * *